Dec. 2, 1952     W. W. ODELL     2,620,313
REGENERATION OF FLUIDIZED IRON OXIDE CATALYST
Filed June 1, 1949
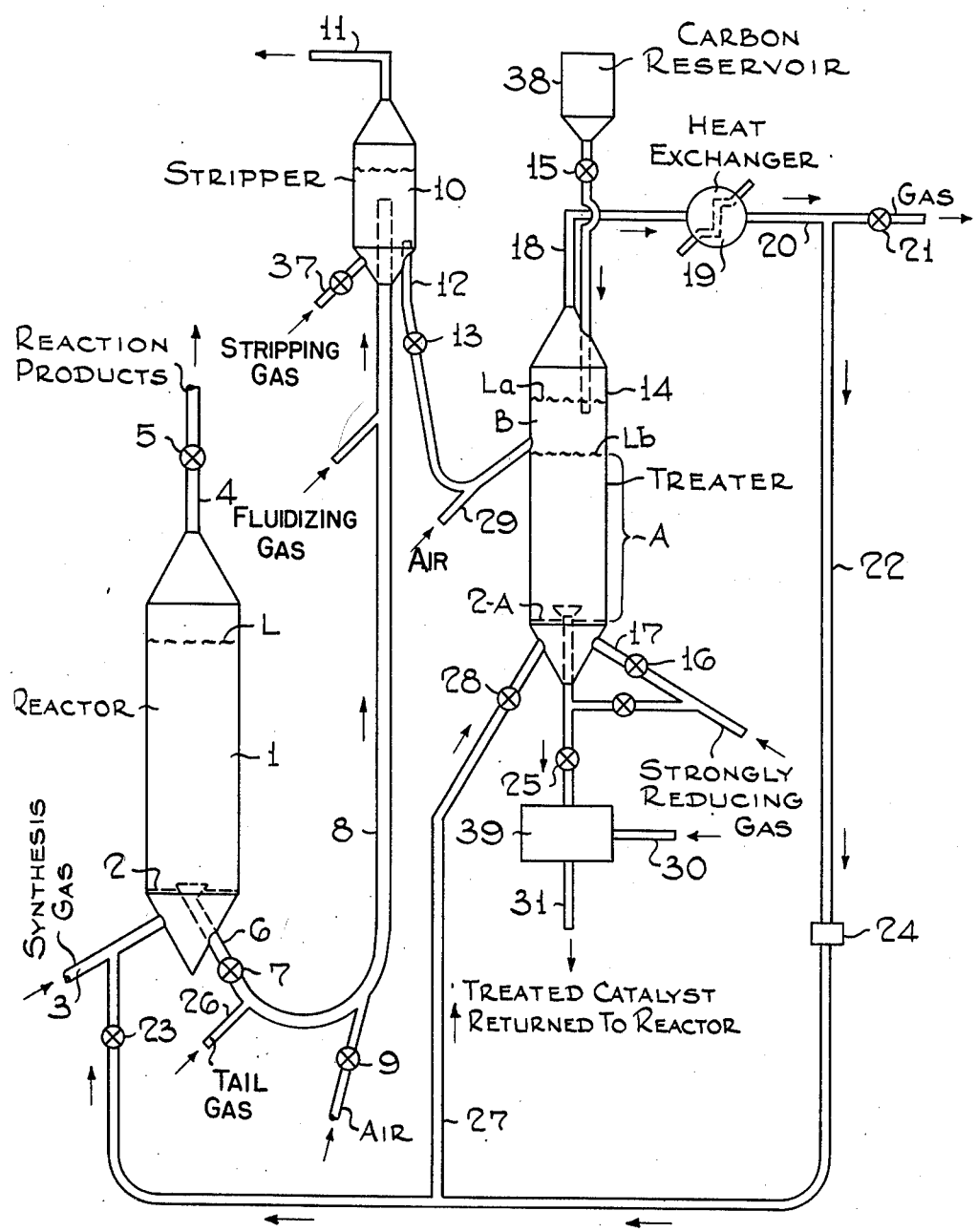
William W. Odell    Inventor
By J. Cashman   Attorney Patented Dec. 2, 1952

2,620,313

UNITED STATES PATENT OFFICE 2,620,313

REGENERATION OF FLUIDIZED IRON OXIDE CATALYST

William W. Odell, New York, N. Y., assignor to Standard Oil Development Company, a corporation of Delaware Application June 1, 1949, Serial No. 96,517

13 Claims. (Cl. 252—417)

This invention relates to the catalytic conversion of carbon oxides with hydrogen to form valuable synthetic products. The invention is more particularly concerned with an improved method of reconditioning finely divided catalysts having a high activity and selectivity for the formation of normally liquid hydrocarbons in the catalytic conversion of carbon monoxide with hydrogen employing the so-called fluid solids technique.

The synthetic production of liquid hydrocarbons from gas mixtures containing various proportions of carbon monoxide and hydrogen is already known and numerous catalysts, usually containing an iron group metal, have been described which are specifically active in promoting the desired reactions at certain preferred operating conditions. For example, cobalt supported on an inert carrier is used when relatively low pressures (atmospheric to about 5 atmospheres) and low temperatures (about 375°–425° F.) are applied in the manufacture of a substantially saturated hydrocarbon product while at the higher temperatures (about 450°–750° F.) and higher pressures (about 5–25 atmospheres and higher) required for the production of unsaturated and branched chain products of high antiknock value, iron type catalysts are more suitable.

In both cases, the reaction is strongly exothermic and the utility of the catalyst declines steadily in the course of the reaction chiefly due to the deposition of non-volatile conversion products such as carbon, paraffin wax, and the like, on the catalyst, and to the gradual conversion of the metallic catalyst to the oxidized state.

The extremely exothermic character and high temperature sensitivity of the synthesis reaction and the relatively rapid catalyst deactivation had led, in recent years, to the application of the so-called fluid solids technique wherein the synthesis gas is contacted with a turbulent bed of finely divided catalyst fluidized by the gaseous reactants and products. This technique permits continuous catalyst replacement and greatly improved heat dissipation and temperature control.

However, the adaptation of the hydrocarbon synthesis to the fluid solids technique has encountered serious difficulties, particularly with respect to catalyst deposits and their detrimental effects on the fluidization characteristics and mechanical strength of the catalyst.

As stated above, one of the most important modifications of the hydrocarbon synthesis requires the use of iron type catalysts. These catalysts are the outstanding representatives of a group of catalysts which combine a high synthesizing activity and selectivity toward normally liquid products with a strong tendency to carbonize during the synthesis reaction, that is, to form fixed carbon or coke-like deposits on the catalyst which can not be readily removed by conventional methods of synthesis catalyst regeneration such as extraction, steam-treating or the like.

These carbon deposits, when allowed to accumulate, weaken the catalyst structure, probably due to carbide formation which leads to rapid catalyst disintegration, particularly in fluid operation. The reduction of the true density of the catalyst resulting from its high content of low-density carbon coupled with the rapid disintegration of the catalyst particles causes the fluidized catalyst bed to expand, thereby reducing its concentration of catalyst and ultimately resulting in the loss of the catalyst bed because it becomes impossible to hold the catalyst in a dense phase at otherwise similar fluidization conditions. With these changes in fluid bed characteristics, the heat transfer from and throughout the bed decreases markedly favoring further carbonization and accelerating the deterioration of the fluidity characteristics of the bed.

These difficulties may be overcome, quite generally, by subjecting the carbonized catalyst continuously or intermittently to a regenerating treatment by which carbon is burnt off the catalyst with the aid of an oxidizing gas. However, oxidative regeneration of the catalyst if not carefully controlled with respect to the oxidation conditions may frequently lead to an undesirable over-oxidation of the iron component of the catalyst. In addition, such catalyst fines of undesirably small particle size as have been formed prior to regeneration are not restored to the original readily fluidizable particle size by this regeneration treatment, particularly when carried out in fluid type regenerators. These fines may, therefore, continue to accumulate and eventually interfere with an efficient operation of the process unless they are discarded from the catalyst cycle, which, of course, constitutes an appreciable loss of valuable material.

Closely allied to the problem of catalyst inactivation by deposition of carbon and wax formation is the related problem of catalyst oxidation. As a result of the synthesis reaction with an iron catalyst, $CO_2$ and $H_2O$ are formed in accordance with the reactions:

(1) $\quad CO + 2H_2 \rightarrow (CH_2) + H_2O$
(2) $\quad 2CO + H_2 \rightarrow (CH_2) + CO_2$ With the feed compositions usually employed in the synthesis reaction, the ratio of hydrogen to CO consumed is considerably less than the ratio of these components present in the fresh feed and as a result, low conversions of the synthesis gas to useful products occurs. This is overcome by recycling tail gas, the $CO_2$ present therein and formed as a result of reaction (2) reacting with the $H_2$ in the reactor to form CO and $H_2O$. This results in increased $H_2$ consumption, but also this tends to increase the concentration of oxidizing gases in the reactor, and thus promotes catalyst oxidation.

Highly reduced catalysts tend to produce less wax in the synthesis reactor, thus permitting operations relatively free of fluidization difficulties and maintenance catalysts of high activity level. When the oxygen content of the catalyst rises above about 10%, wax formation is rapid, and catalyst inactivation as well as fluidization difficulties ensue.

The present invention, which comprises reducing the partially oxidized catalyst in a reducing zone in the presence of a bed of highly heated incandescent carbonaceous solids, overcomes the aforementioned difficulties associated with carbonaceous solid deposit and catalyst oxidation, and affords various additional advantages. These advantages, the nature of the invention, and the manner in which it is carried out will be fully understood from the following description thereof read with reference to the accompanying drawing.

In accordance with the present invention, spent and contaminated catalyst is circulated hot from the reactor to a stripping chamber with tail gas, and is circulated from the stripper to a catalyst treater with sufficient air to raise the temperature thereof to above 1100° F., and is caused to pass downwardly therein through a bed of incandescent carbon confined as an upper layer in a fluidized bed, the thus circulated catalyst passing down to the lower layer of said bed, meanwhile passing a hot gas stream initially containing a strongly reducing gas, such as 80% CO or 90% $H_2$ or a mixture of these, or a gas containing CO and $H_2$ which is initially substantially free of $CO_2$ and $H_2O$, up through the bed at a fluidizing velocity and withdrawing the thus treated catalyst, rapidly cooling the same preferably below 300° F. with, and simultaneously heating, the said strongly reducing gas and returning it to the reactor.

Prior and heretofore it has been proposed to regenerate spent iron synthesis catalyst at elevated temperatures in the presence of a reducing gas in a fluid solids regenerator. Such processes suffer the disadvantage that the reducing gas after passage through the regenerator is not suitable for further employment in either the synthesis reaction or as recycle to the reactor, because of the $H_2O$ and $CO_2$ formed as a result of the reduction process. Without elaborate purification and scrubbing, recycling this spent "reducing" gas would re-oxidize the catalyst in the regenerator or the reactor. However, in accordance with the present invention, wherein the catalyst to be regenerated flows downward through a bed of fluidized hot carbonaceous solids, and wherein a stream of reducing gas fluidizes the solids as well as reduces the spent catalyst initially in the form of $Fe_3O_4$, the $CO_2$ and $H_2O$ resulting from the reduction is largely reacted with the carbon in the upper layer of said bed to form CO and $H_2$, and thus the gas stream is available for either recycling to the regenerator or passage to the reactor as part of the synthesis gas feed.

Having set forth its objects and general nature, the invention will best be understood from the more detailed description hereinafter in which reference will be made to the accompanying drawing which illustrates diagrammatically a system suitable for carrying out a preferred embodiment of the invention.

Referring now to the drawing, the system illustrated therein essentially comprises a synthesis reactor 1, and a reduction reactor 14, whose functions and cooperation will be forthwith explained.

In operation, synthesis reactor 1 contains a dense, turbulent, fluidized mass of iron catalyst such as sintered pyrites ash promoted with about 1.5% of potassium carbonate and having an original particle size of about 20–100 microns, preferably 50–100 microns. Synthesis feed gas containing about 0.8–3 volumes of $H_2$ per volume of CO is supplied from line 3 to reactor 1 at a suitable synthesis pressure of 5–50 atm., preferably 20–40 atm. The synthesis temperature may be maintained between the appoximate limits of 500°–800° F., preferably between about 550° and 700° F., by conventional methods of heat removal (not shown). Details of the operation of fluid synthesis reactors using iron catalysts are well known and need not be further specified here, beyond indicating that the iron catalyst is fluidized in reactor 1 by gas admitted through line 3 and grid 2, and that the gaseous reaction products are removed through line 4 and valve 5.

As stated before, carbon is deposited on the catalyst in reactor 1 and in about 100 hours as much as 50 lbs. of carbon may be deposited for each 100 lbs. of catalyst. This will tend to diminish the activity of the catalyst and also cause its physical disintegration so that fines having particle sizes smaller than 20 microns will be formed in excessive quantities. If this condition is not corrected, the density of the catalyst phase will drop rapidly and the entire catalyst will be eventually blown out of reactor 1. Furthermore, as a result of the synthesis reaction, the catalyst becomes partially oxidized to $Fe_3O_4$, further diminishing its activity.

When the oxygen content of the catalyst within reactor 1 is above, say 10%, or when the fines, carbon, and wax accumulation has reached a stage where maintenance of a dense fluidized bed of catalyst becomes difficult, catalyst is withdrawn downwardly at a controlled rate from reactor 1 through offtake 6 and valve 7, and is conducted in the presence of air or other oxidizing gas upwardly through conduit 8, the air being introduced through valve 9, and the catalyst is heated to a temperature of about 1100° F. in its travel to stripper 10. The catalyst is conveyed preferably in suspension in a stream of tail gas introduced through line 26, the amount of air introduced through 9 being sufficient to effect significant chemical change in the catalyst.

The catalyst in stripper 10 is maintained as a dense bed suspension while overhead through line 11 is withdrawn the fluidizing gases. If desired, an auxiliary stripping gas, such as steam, nitrogen, $CO_2$, etc. may be introduced through 37 to aid in stripping the catalyst, and fluidizing gases may be removed overhead through line 11 and sent to the tail gas treating system.

Hot catalyst particles are continually withdrawn from stripper 11 through line 12 and valve 13 and passed to the upper zone of catalyst regenerator 14. Also introduced into the upper portion of treater 14 through line 15 is a stream of finely divided carbonaceous solids, such as coke, having a suitable particle size to be fluidized by the strongly reducing fluidizing gas admitted through line 17. These solids are supplied from reservoir 38, and have a particle size within the range of about 60–100 mesh or larger.

A strongly reducing gas from any desired source, such as $H_2$, CO, or a mixture of these, or synthesis gas itself, and having a total $H_2O$ and $CO_2$ content less than about 10% is introduced as a fluidizing and reducing gas into treater 14 through valve 16 and conduit 17 and passes upwardly at a velocity sufficient to maintain the carbonaceous solids in the form of a dense, turbulent, mass corresponding to zone A. This bed of carbonaceous solids is maintained at a temperature of about 1600° to 1800° F. by means of a combustion supporting fluid, such as a limited amount of air or oxygen, supplied through 29.

The catalyst particles introduced through line 12 into treater 14 are likewise fluidized by the reducing gas but, being heavier, pass downwardly countercurrent to the upflowing reducing gas. This countercurrent flow may be further promoted by including packing and/or baffles within reactor 14. The rate of settling of the catalyst particles is adjusted, by adjusting the fluidizing gas velocity and the relative size of the catalyst and coke particles and proportion of gas to catalyst, to reduce the oxygen content of the catalyst, preferably to about 3% or less.

The reduced catalyst discharges from the lower portion of treater 14 into a cooling chamber 39 wherein the temperature of the catalyst may be reduced to about 200°–400° F. by a spray of benzole, propane, a volatile hydrocarbon mixture, or a cool gas introduced through line 30. The cooled catalyst may then be withdrawn through line 31 and be returned to reactor 1 or, if desired, may be subjected to a grinding and screening process to prevent addition to reactor 1 of any agglomerates that may have formed during the treating process.

The gas stream passing up through treater 14 and counter-current to the settling iron catalyst is partially converted to $H_2O$ and/or $CO_2$ during the reduction of the iron oxide and these gases are in turn reduced by contact with the incandescent fluidized carbon bed in zone B, and are reduced to CO and $H_2$. The effluent gas leaving the treater 14 through line 18 passes through heat exchanger 19, offtake 20, conduit 22, circulating pump 24 and valve 23 to reactor 1, wherein it comprises a portion of the feed to that unit. If desired, it may be passed in part from pump 24 through conduit 27 and valve 28 back into the treater as reducing gas, while excess gas may be bled from the system through valve 21 as desired. In either case, separation of water or $CO_2$ is not required, thus effecting substantial process and equipment savings.

Since $CO_2$ and $H_2O$ are not rapidly reduced by carbon at temperatures much below 1650° F., and since iron particles in a fine state of subdivision show tendency to agglomerate at these temperatures, it is desirable when the reducing gas stream is to be recirculated through treater 14, to maintain a higher temperature in the bed of carbon in zone B than when the gas is not to be recycled. This is done by introducing, as indicated, a combustion-supporting fluid through line 29 or otherwise into zone B. The catalyst particles traveling downwardly in the treater are continuously cooled by the rising gas stream. The rate of flow of the catalyst through the treater and the temperature and rate of flow of the rising reducing gases are controlled to avoid excessive agglomeration of iron particles. However, catalyst fines produced in reactor 1 preferably are agglomerated in this process.

The technique of employing an incandescent bed of fluidized carbonaceous solids to regenerate spent iron synthesis catalyst may also be employed in another modification of the invention wherein it is not desired to reduce the catalyst completely to the metal, and wherein it is desired to economize still further in the reducing gases employed. In this modification, a portion of the catalyst is withdrawn from the reactor and is continuously passed downwardly through a fluidized mass of fine size carbonaceous solids, as before, but at a temperature range of from about 1400° to 1800° F. The catalysts are exposed to this temperature in contact with the hot carbon for a brief period of time only, while simultaneously a reducing gas such as $H_2$ or CO containing a relatively small amount of steam is passed upwardly through the mass of carbonaceous solids as a fluidizing agent, thereby simultaneously oxidizing some of the carbon and carbonaceous deposits on the catalyst and partly reducing the catalyst, which reduction occurs on the surface only. The thus treated catalyst is then quenched and returned as before, to the reactor, while the gas generated and passing out of the treater is, as a result of its reaction with the carbon at high temperatures, suitable for recirculation to the treater. By employing very short contact time of the catalyst with the carbon, complete reduction of the iron is avoided and hence agglomeration even at these high temperatures is minimized.

While the foregoing specific applications have served to illustrate specific applications of the invention, other modifications and applications obvious to those skilled in the art are within its scope.

What is claimed is:

1. The process of regenerating spent finely divided iron type hydrocarbon synthesis catalyst which comprises withdrawing spent catalyst from a hydrocarbon synthesis reaction zone, conveying said withdrawn catalyst by means of a combustion-supporting gas lift to a stripping zone, circulating the catalyst from said stripping zone to a catalyst treating zone with sufficient air to burn contaminating carbon off said catalyst and to raise the temperature of said catalyst to at least 1100° F., separating the thus heated catalyst from the gaseous products of combustion, passing said heated catalyst downwardly through a densely fluidized mass of carbonaceous solids confined in a treating zone in a strongly reducing atmosphere at a temperature of about 1600°–1800° F., thereby reducing the outer surfaces of the catalyst particles as they pass through said mass, withdrawing hot reduced catalyst particles from said treating zone, withdrawing gaseous fluidizing medium from said zone, cooling said particles by contact with a cool gasiform fluid, and returning the thus treated and cooled catalyst particles to the hydrocarbon synthesis zone.

2. The process of claim 1 wherein a strongly reducing gas selected from a member of the group consisting of $H_2$ and CO is the upflowing gasiform fluidizing medium in said catalyst treating zone.

3. The process of claim 2 wherein part of said upflowing fluidizing gas stream discharged from said treater is returned thereto as a fluidizing and treating medium.

4. The process of claim 2 wherein said gaseous fluidizing medium withdrawn from said treating zone contains only minor amounts of water and $CO_2$.

5. The process of claim 2 wherein said gasiform medium comprises a major proportion of $H_2$ and only a minor proportion of steam and the temperature of the carbonaceous solids fluidized in said treater is above about 1300° F. but below about 1800° F.

6. The continuous process of passing to a stripping zone spent hot iron hydrocarbon synthesis catalyst particles containing carbonaceous deposits on their surfaces while suspended in a gasiform stream containing sufficient oxygen to heat said particles to about 1100° F. by combustion of said carbon, separating the thus heated particles from the fluidizing medium and combustion products, passing said particles to a catalyst reduction zone, passing said particles downwardly at a controlled rate in said zone through a mass of incandescent small size carbonaceous solids confined in said zone as a dense fluidized bed, passing a strongly reducing gaseous stream upwardly through said bed at a velocity adapted to maintain said bed densely fluidized in contact with said catalyst particles and withdrawing and cooling the thus treated catalyst particles.

7. A process for reducing an iron-comprising catalyst comprising passing the catalyst in a fine state of division by settling downwardly through and intermingled with a mass of hot small size carbonaceous solids fluidized as a dense bed in a reaction zone, promoting the reduction of said catalyst at a temperature between about 1400 and 1800° F. by contact with a strongly reducing gas while intimately intermingled with said solids in said zone and withdrawing the thus reduced catalyst, said strongly reducing gas being a member of the group consisting of $H_2$ and CO.

8. A process for reducing an oxidized iron catalyst comprising passing the finely divided catalyst by settling downwardly at a predetermined rate through and in intimate contact with a mass of hot, incandescent, small size carbonaceous solids while said solids are densely fluidized in a reaction zone as a bed with a well-defined top level, promoting chemical reduction on the outer surface only of the particles of said catalyst at a temperature between about 1400 and 1800° F. by contact with a hot, strongly reducing gas while intimately intermingled with said solids in said zone and withdrawing the thus treated catalyst particles from substantially the bottom of said bed, said predetermined rate being that which is sufficient for the reduction of said catalyst particles to occur only on the outer surface thereof, said strongly reducing gas being a member of the group consisting of CO and $H_2$.

9. A process for reducing a finely divided catalyst comprised of oxidized iron comprising contacting said catalyst with small size, incandescent carbonaceous solids, densely fluidizing both said catalyst and said solids while they are confined as a bed in a regeneration zone by an upwardly flowing, hot, strongly reducing gas, thereby reducing said catalyst and withdrawing the thus treated catalyst from substantially the bottom of said bed by so controlling the fluidizing stream velocity that the catalyst particles settle out of said bed, said strongly reducing gas being a member of the group consisting of CO and $H_2$.

10. The continuous process of reducing a finely divided catalyst comprising an oxide of iron comprising fluidizing a mass of hot, small size, incandescent, carbonaceous solids as a dense bed in a regeneration zone by passing a stream of hot, strongly reducing gas upwardly therethrough, simultaneously continuously supplying the catalyst to be treated to substantially the top of said zone, passing it down through the fluidized mass in said zone by settling at a rate adapted to provide the desired amount of reduction on the surfaces only of the particles of said catalyst and withdrawing the thus treated catalyst particles from substantially the bottom of said bed, said strongly reducing gas being a member of the group consisting of $H_2$ and CO.

11. The process of claim 10 in which the carbonaceous solids are at a temperature of the order of about 1400 to 1800° F.

12. The process of claim 10 in which the hot, carbonaceous solids are continuously supplied to said bed at a rate adapted to maintain a substantially uniform bed level in said zone, and in which the catalyst particles are introduced into said bed at a temperature of the order of 1100° F. at a rate equal to the rate of withdrawal of the treated catalyst particles from said bed.

13. The process of claim 10 in which the hot reducing gas initially contains a relatively small amount only of $CO_2$ and steam.

WILLIAM W. ODELL.

REFERENCES CITED

The following references are of record in the file of this patent:

UNITED STATES PATENTS

| Number | Name | Date |
|---|---|---|
| 2,166,207 | Clark | July 18, 1939 |
| 2,321,310 | Moore | June 8, 1943 |
| 2,343,780 | Lewis | Mar. 7, 1944 |
| 2,360,787 | Murphree | Oct. 17, 1944 |
| 2,436,938 | Scharmann et al. | Mar. 2, 1948 |
| 2,462,861 | Gunness | Mar. 1, 1949 |